No. 858,631. PATENTED JULY 2, 1907.
J. N. & J. P. SIMPSON.
WAGON WHEEL GREASER.
APPLICATION FILED FEB. 26, 1907.
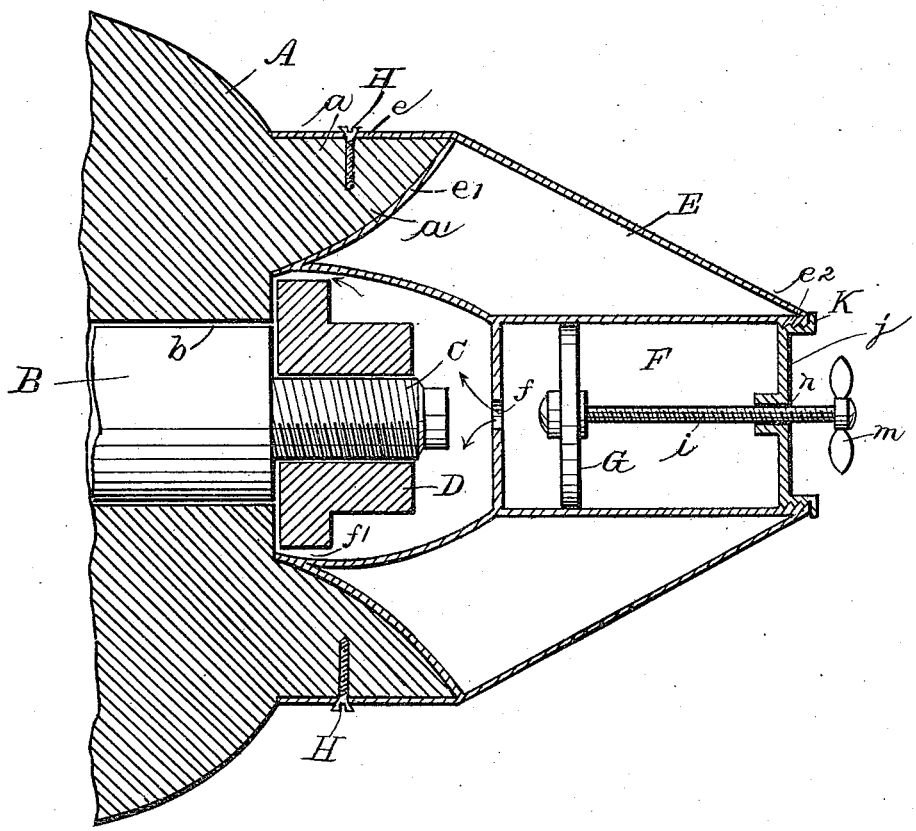

UNITED STATES PATENT OFFICE.

JAMES N. SIMPSON AND JOHN P. SIMPSON, OF RIDGWAY, MISSOURI.

WAGON-WHEEL GREASER.

No. 858,631.      Specification of Letters Patent.      Patented July 2, 1907.

Application filed February 26, 1907. Serial No. 359,532.

*To all whom it may concern:*

Be it known that we, JAMES N. SIMPSON and JOHN P. SIMPSON, citizens of the United States, residing at Ridgway, in the county of Harrison and State of Missouri, have invented certain new and useful Improvements in Wagon-Wheel Greasers, of which the following is a specification.

The special object of the invention is to make a device whereby a wagon wheel will not need removal whenever the axle skein requires grease.

The drawing herewith is a diametrical section through the outer part of the hub of a wheel, showing my device attached thereto.

In the drawing, A designates the hub of a wagon wheel, which revolves on the axle skein B, which is provided with the usual end spindle C and tap D.

E is the lubricator, which has a band $e$, to fit around the end $a$, of the hub A, while the part $e'$, fits under the curved part $a'$. The part $e$ has screws H, which hold it securely to the part $a$, of the hub.

F is the grease chamber, having its central hole $f$, and $f'$ an open space around tap D, leading to the space $b$, between the hub and the skein B.

The grease-cup F is provided with a piston G, which is attached to the lower end of a rod $i$, while the other end of said rod passes through the stopper $j$, screwed into the outer end of the cup. This stopper has a central, threaded aperture $n$, and may have a flange K, resting against the outer edge of the cup, where it joins the outer flange $e^2$. The outer end of the piston rod $i$, has a handle $m$, by which said rod may be moved up and down in the cup. After the lubricator has been made fast to the hub by the screws H, the grease is put into the cup, the piston inserted therein, and the stopper $j$ screwed on; then the grease is forced by the piston through the aperture $f$, around the tap D, into the channel $f'$ and about the skein B. As the grease is used up by the friction, the wagon driver has only to force the piston farther into the cup, until the supply of grease is exhausted. Thus it will be seen that one supply of grease, with my device, will last a long time, whereas in the old way, the wheel would have to be taken off many times, which would cause the loss of much time and labor.

Having thus described all that is necessary to a full understanding of our invention, what we claim as new and desire to protect by Letters Patent, is—

The lubricator E having the circular band $e$, concavity $c'$, pistoned grease-cup F, and the cutaway to form the space $f$, in combination with a wagon wheel-hub having the circular end $a$, over which fits the band $e$, and under which fits the concavity $e'$, as shown and described.

In testimony whereof we affix our signature, in presence of two subscribing witnesses.

JAMES N. SIMPSON.
                               JOHN P. SIMPSON.

Witnesses:
     H. M. KERN,
     C. T. PRATHER.